(12) United States Patent
Feldman et al.

(10) Patent No.: US 10,628,888 B2
(45) Date of Patent: Apr. 21, 2020

(54) SYSTEM TO AUTOMATICALLY DETERMINE SUPPLEMENTAL INSURANCE INFORMATION FOR A VIRTUAL HOME DISPLAY

(71) Applicant: Hartford Fire Insurance Company, Hartford, CT (US)

(72) Inventors: Julia M. Feldman, West Hartford, CT (US); Steven J. Fernandes, West Hartford, CT (US); Susan D. Pouliot, Windsor, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 697 days.

(21) Appl. No.: 14/814,990

(22) Filed: Jul. 31, 2015

(65) Prior Publication Data
US 2017/0032466 A1   Feb. 2, 2017

(51) Int. Cl.
*G06Q 40/08*   (2012.01)
*G06Q 50/16*   (2012.01)
(Continued)

(52) U.S. Cl.
CPC ........... *G06Q 40/08* (2013.01); *G06F 16/248* (2019.01); *G06F 16/9535* (2019.01); *G06Q 50/16* (2013.01); *H04L 63/08* (2013.01)

(58) Field of Classification Search
CPC .... G06Q 40/08; G06Q 10/20; G06Q 30/0283; G06Q 10/0635; G06Q 50/16; G06F 16/9535; G06F 16/248; H04L 63/08
See application file for complete search history.

(56) References Cited

U.S. PATENT DOCUMENTS 6,826,539 B2 * 11/2004 Loveland ............... G06Q 10/06
 705/4
6,829,584 B2   12/2004 Loveland
(Continued)

OTHER PUBLICATIONS

"Costs and consequences of flooding and the impact of the National Flood Insurance Program" Sarmiento et al., 2006. Author: Sarmiento C, Miller T. Publication year: 2006. Publication venue: Pacific Institute for Research and Evaluation. Calverton, Maryland (Year: 2006).*

(Continued)

*Primary Examiner* — Kito R Robinson
*Assistant Examiner* — Tony P Kanaan
(74) *Attorney, Agent, or Firm* — Howard IP Law Group, PC

(57) ABSTRACT

According to some embodiments, a first insured party may be automatically associated with first virtual home information including real world elements of a virtual home. The first virtual home information may also be automatically associated with first insurance policy information of the first insured party. A virtual home display request may be received from a remote insured party device associated with the first insured party. Responsive to the received virtual home display request, a rendering of at least a portion of the virtual home may be automatically facilitated based on the first virtual home information, including at least some of the real world elements, and the first insurance policy information. A selection of one of the real world elements may be received from the remote insured party device, and, responsive to the selected real world element, supplemental insurance information may be transmitted to the remote insured party device.

23 Claims, 15 Drawing Sheets

(51) Int. Cl.
*G06F 16/248* (2019.01)
*G06F 16/9535* (2019.01)
*H04L 29/06* (2006.01)

(56) References Cited

U.S. PATENT DOCUMENTS

| | | | | |
|---|---|---|---|---|
| 8,065,621 | B2* | 11/2011 | Appel | G06Q 10/06 |
| | | | | 715/723 |
| 8,219,426 | B1* | 7/2012 | Yager | G06Q 40/08 |
| | | | | 705/4 |
| 8,655,683 | B2 | 2/2014 | Grundel et al. | |
| 8,688,483 | B2* | 4/2014 | Watts | G06Q 40/08 |
| | | | | 705/37 |
| 8,694,501 | B1 | 4/2014 | Trandal et al. | |
| 9,773,281 | B1* | 9/2017 | Hanson | G06Q 40/08 |
| 10,055,793 | B1* | 8/2018 | Call | G06Q 50/16 |
| 2009/0265193 | A1* | 10/2009 | Collins | G06Q 30/0185 |
| | | | | 705/4 |
| 2012/0047082 | A1* | 2/2012 | Bodrozic | G06Q 50/16 |
| | | | | 705/314 |
| 2012/0095783 | A1 | 4/2012 | Buentello et al. | |
| 2013/0290033 | A1 | 10/2013 | Reeser et al. | |
| 2014/0180725 | A1* | 6/2014 | Ton-That | G06Q 40/08 |
| | | | | 705/4 |
| 2015/0046194 | A1* | 2/2015 | Waddell | G06Q 40/04 |
| | | | | 705/4 |
| 2015/0073834 | A1* | 3/2015 | Gurenko | G06Q 40/08 |
| | | | | 705/4 |
| 2015/0106131 | A1* | 4/2015 | Woods | G06Q 40/08 |
| | | | | 705/4 |
| 2015/0170288 | A1* | 6/2015 | Harton | G06Q 40/08 |
| | | | | 705/4 |
| 2015/0227864 | A1* | 8/2015 | Payne | G06Q 10/067 |
| | | | | 705/348 |
| 2015/0356685 | A1* | 12/2015 | Lindberg | G06Q 40/08 |
| | | | | 705/4 |
| 2015/0356686 | A1* | 12/2015 | Cook | G06Q 40/08 |
| | | | | 705/4 |
| 2016/0203561 | A1* | 7/2016 | Peterson, IV | G06Q 40/08 |
| | | | | 705/4 |

OTHER PUBLICATIONS

"Estimating welfare in insurance markets using variation in prices", Author: Einav L, Finkelstein A, Cullen M. Publication year: 2010. Publication venue: The quarterly journal of economics. https://www.nber.org/papers/w14414.pdf. See abstract (Year: 2010).*

"Learning Center—Home Safety Inspection Checklist", © 2007-2015 American Family Insurance, retrieved from the Internet http://www.amfam.com/learning-center/my-home/interactive-home.asp, retrieved Jul. 15, 2015, 2pgs.

* cited by examiner

| VIRTUAL HOME ID 802 | ASSOCIATED INSURANCE POLICY ID 804 | ROOM 806 | ITEM 808 | SUPPLEMENTAL INFORMATION 810 |
|---|---|---|---|---|
| VH_1001 | P12345678 | BASEMENT | WASHER/DRYER | EQUIPMENT BREAKDOWN COVERAGE |
| VH_1001 | P12345678 | BASEMENT | FURNACE | EQUIPMENT BREAKDOWN COVERAGE |
| VH_1001 | P12345678 | BASEMENT | EXTINGUISHER | DISCOUNT |
| VH_1001 | P12345678 | BEDROOM | BED | NONE |
| VH_1001 | P12345678 | BEDROOM | FAN | NONE |
| VH_1001 | P12345678 | BEDROOM | SMOKE DETECTOR | BATTERY CHECK PUSH NOTIFICATION |
| VH_1001 | P12345678 | BEDROOM | WINDOW | ALARM DISCOUNT |
| VH_1001 | P12345678 | BEDROOM | NIGHTSTAND | JEWELRY PROTECTION |

FIG. 8

SYSTEM TO AUTOMATICALLY DETERMINE SUPPLEMENTAL INSURANCE INFORMATION FOR A VIRTUAL HOME DISPLAY

FIELD

The present invention relates to computer systems and, more particularly, to computer systems associated with an automatic determination of supplemental insurance information for a virtual home.

BACKGROUND

An insurer may provide property insurance to an insured party, such as a homeowner. For example, a homeowner's insurance policy might help a homeowner prepare for risks related weather damage, flood damage, fire damage, etc. In addition, different types of insurance policies may be associated with different types of coverages, deductible amounts, overall insurance limits, etc. It can be difficult, in some cases, for an insured party to understand how these different characteristic apply to his or her home. An insured party might be, for example, unsure if his or her homeowner's insurance policy covers a situation in which a water heater begins to leak. Similarly, in can be difficult for an insurance enterprise to understand and predict the questions that policyholders may have. It would therefore be desirable to provide systems and methods to facilitate an exchange of information between an insurer and an insured party in an automated, efficient, secure, and accurate manner.

SUMMARY

According to some embodiments, systems, methods, apparatus, computer program code and means may facilitate an exchange of information between an insurer and an insured party. In some embodiments, a first insured party may be automatically associated with first virtual home information including real world elements of a virtual home. The first virtual home information may also be automatically associated with first insurance policy information of the first insured party. A virtual home display request may be received from a remote insured party device associated with the first insured party. Responsive to the received virtual home display request, a rendering of at least a portion of the virtual home may be automatically facilitated based on the first virtual home information, including at least some of the real world elements, and the first insurance policy information. A selection of one of the real world elements may be received from the remote insured party device, and, responsive to the selected real world element, supplemental insurance information may be transmitted to the remote insured party device.

Some embodiments provide: means for automatically associating a first insured party with first virtual home information including real world elements of a virtual home; means for automatically associating the first virtual home information with first insurance policy information of the first insured party; means for receiving, from a remote insured party device associated with the first insured party, a virtual home display request; responsive to the received virtual home display request, means for automatically facilitating a rendering of at least a portion of the virtual home based on the first virtual home information, including at least some of the real world elements, and the first insurance policy information; means for receiving, from the remote insured party device, a selection of one of the real world elements; and responsive to the selected real world element, means for transmitting, to the remote insured party device, supplemental insurance information.

A technical effect of some embodiments of the invention is an improved, secure, and computerized method to facilitate an exchange of information between an insurer and an insured party. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 8 is a tabular portion of a virtual home database according to some embodiments.

DETAILED DESCRIPTION

Figure 1:
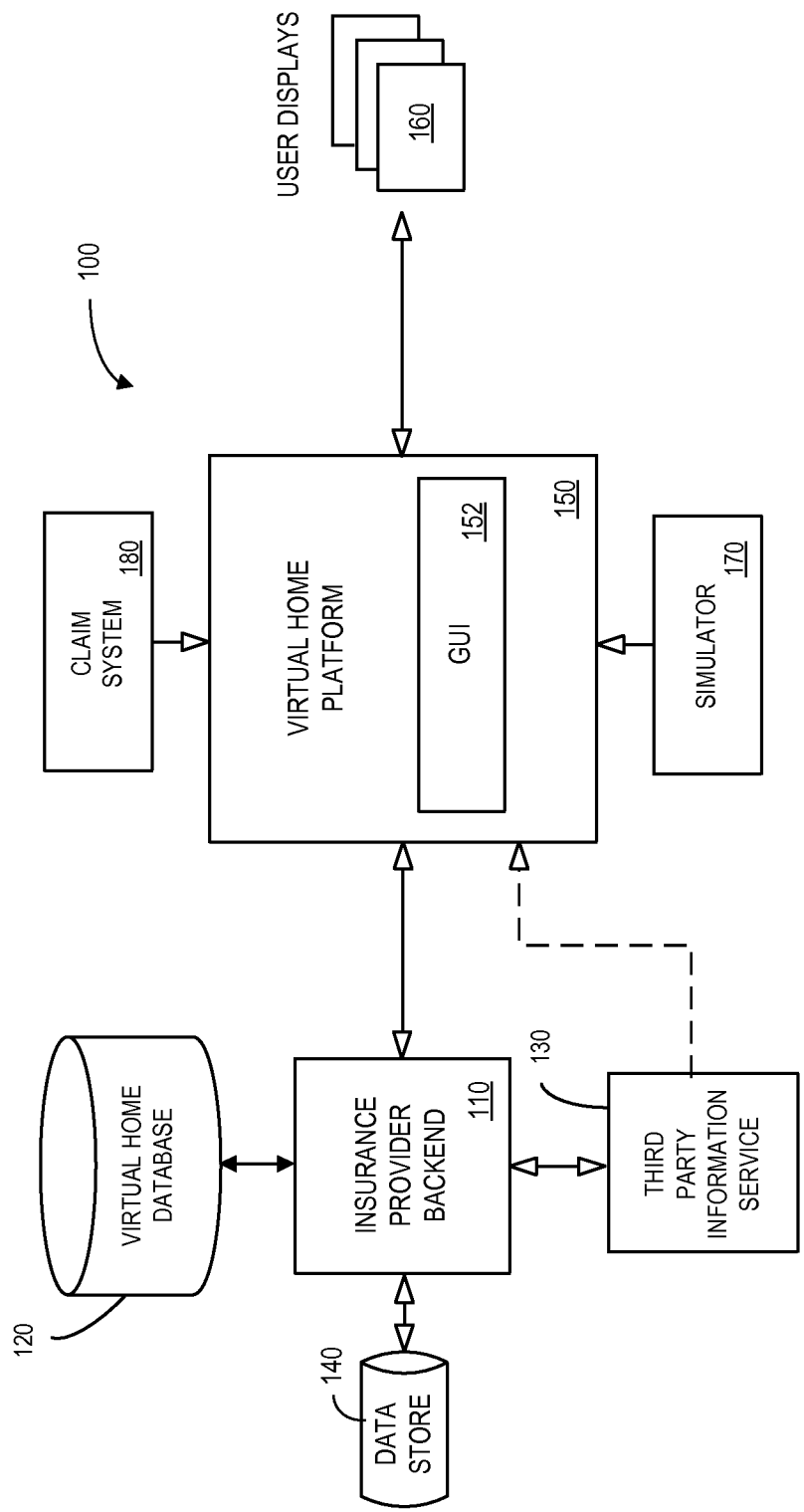
FIG. 1 is block diagram of a system according to some embodiments of the present invention.

An insurer may provide insurance, such as homeowner's insurance, to an insured party, such as a homeowner, and different types of insurance policies may be associated with different types of coverages, deductible amounts, overall insurance limits, etc. It can be difficult, in some cases, for an insured party to understand how these different characteristic apply to his or her home. Similarly, in can be difficult for an insurance enterprise to understand and predict the questions that policyholders may have. It would therefore be desirable to provide systems and methods to facilitate an exchange of information between an insurer and an insured party in an automated, efficient, and accurate manner. FIG. 1 is block diagram of a system 100 according to some embodiments of the present invention. In particular, the system 100 includes a virtual home platform 150 that may access an insurance provider backend 110. The insurance provider backend 110 may periodically transmit (e.g., on a daily basis) information about a virtual home to the virtual home platform 150. The virtual home platform 150 may, for example, store this information in a local database. The information about the virtual home might be gathered, for example, from a virtual home database 120. According to some embodiments, the virtual home platform 150 is associated with a smartphone and only communicates with the insurance provider backend 110 when the application is accessed by a user of the smartphone.

The virtual home platform 150 may receive a request for a virtual home display from a requestor device. For example, an insured party might use his or her smartphone to submit the request to the virtual home platform 150. According to some embodiments, information about received requests may be stored at virtual home platform 140 and/or a data store 140 of the insurance provider backend 110. Responsive to the request, the virtual home platform 150 might access information from the insurance provider backend 110 (e.g., associated with different elements of his or her home). The virtual home platform 150 may then use a Graphical User Interface ("GUI") to render user displays 160. According to some embodiments, the insured party may access secure policy information through a validation process that may include a user identifier, password, biometric information, device identifiers, and/or geographic authentication processes.

The virtual home platform 150 and/or a requestor device might be, for example, associated with a Personal Computer ("PC"), laptop computer, smartphone, an enterprise server, a server farm, and/or a database or similar storage devices. The virtual home platform 150 may, according to some embodiments, be associated with an insurance provider.

According to some embodiments, an "automated" virtual home platform 150 may facilitate the provision of virtual home information to an insured party. For example, the virtual home platform 150 may automatically generate and transmit insurance information in connection with the virtual home displays 160. As used herein, the term "automated" may refer to, for example, actions that can be performed with little (or no) intervention by a human.

As used herein, devices, including those associated with the virtual home platform 150 and any other device described herein may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The virtual home platform 150 and/or insurance provider backend 110 may store information into and/or retrieve information from the data store 140. The data store 140 might be associated with, for example, an insurance company, an underwriter, or a claim analysis and might also store data associated with past and current insurance claims. The data store 140 may be locally stored or reside remote from the virtual home platform 150. As will be described further below, the data store 140 may be used by the virtual home platform 150 to generate and/or calculate virtual home information. Some or all of the virtual home information might be, for example, originally provided by a homeowner and/or be automatically populated based on information received from third party information service 130 (e.g., a real estate database). Note that in some embodiments, the third party information service 130 may communicate directly with the virtual home platform 150. According to some embodiments, the virtual home platform 150 communicates information associated with a simulator 170 and/or a claims system 180 to a remote insured party device and/or to an automated system, such as by transmitting an electronic file to an underwriter device, an insurance agent or analyst platform, an email server, a workflow management system, a predictive model, a map application, etc.

Although a single virtual home platform 150 is shown in FIG. 1, any number of such devices may be included. Moreover, various devices described herein might be combined according to embodiments of the present invention. For example, in some embodiments, the virtual home platform 150 and insurance provider backend 110 might be co-located and/or may comprise a single apparatus.

Figure 2:
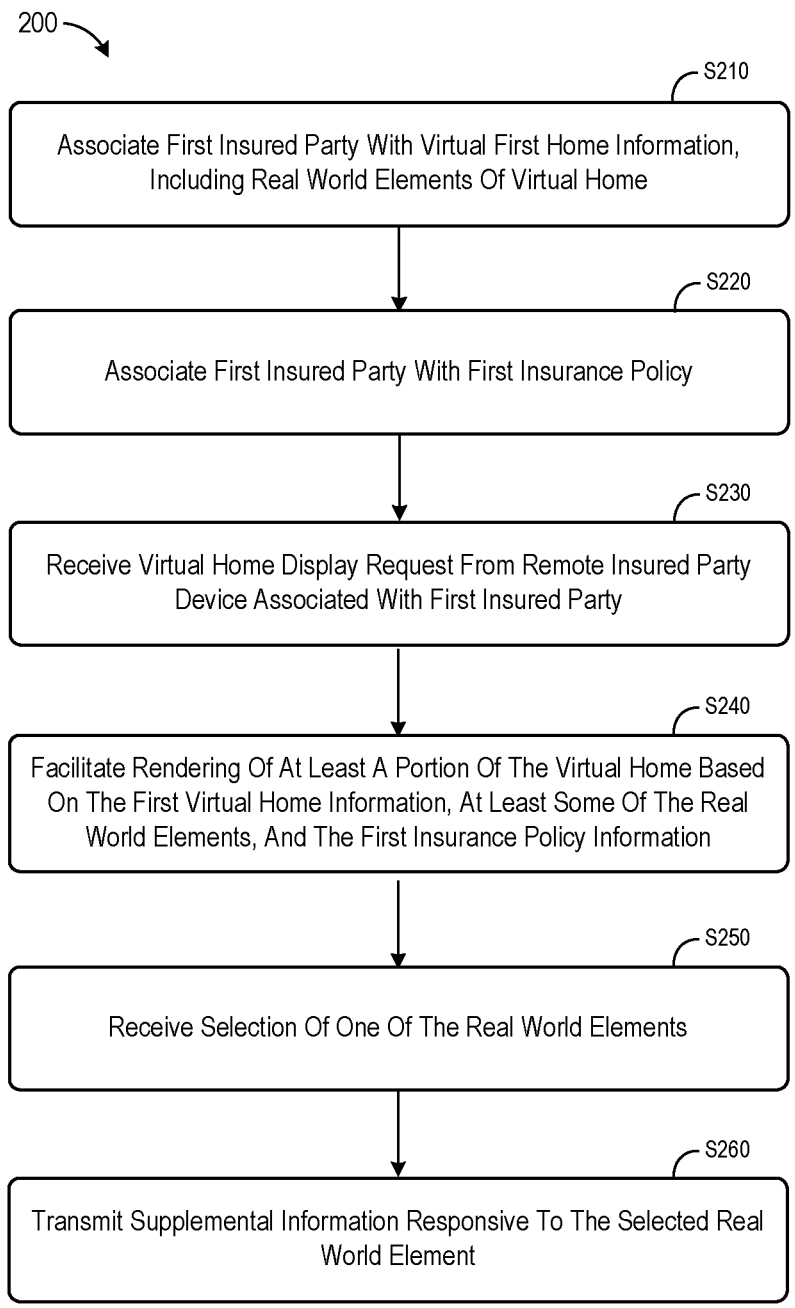
FIG. 2 illustrates a method that might be performed in accordance with some embodiments.

Note that the system 100 of FIG. 1 is provided only as an example, and embodiments may be associated with additional elements or components. According to some embodiments, the elements of the system facilitate an exchange of information between an insurer and an insured party. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a first insured party may be automatically associated with first virtual home information, including real world elements of a virtual home. The first virtual home information and/or real world elements might be associated with, for example, an outside view of the virtual home, rooms within the virtual home, and/or furniture, appliances, and other elements within each room of the virtual home. Note that, as used herein, the phrase "insured party" might, in some cases, refer to an insurance agent who is working together with an insurance customer or potential insurance customer.

At S220, the first insured party and/or the first virtual home information may be automatically associated first insurance policy information of the first insured party. As used herein, the phrase "insurance policy information" might refer to, for example, an insured parties name, address, contact information, insurance coverage dates, premium information, coverage details, deductible amounts, coverage limits, etc. The insurance policy information may be associated with a homeowner's insurance policy and/or may be associated with an existing insurance policy, a potential insurance policy, an insurance policy renewal, and/or an insurance policy upgrade.

At S230, a virtual home display request may be received from a remote insured party device associated with the first insured party. The remote insured party device may comprise, for example, a computer executing a browser, a smartphone executing a browser or an application, eyeglasses, a smart watch, and a virtual reality device.

Responsive to the received virtual home display request, at S240 the system may automatically facilitate a rendering of at least a portion of the virtual home based on the first virtual home information, including at least some of the real world elements, and the first insurance policy information. The rending may be associated with, for example, an exterior of the virtual home, a floorplan of the virtual home, and/or a room within the virtual home. The rending might be displayed on a screen, be provided as augmented reality overlaid onto a real world image, and/or be used to create an immersive three-dimensional virtual reality environment.

At S250, a selection of one of the real world elements may be received from the remote insured party device. For example, the insured party might use a touch screen to select the roof of the virtual home, a refrigerator in a kitchen, etc. Responsive to the selected real world element, supplemental insurance information may be transmitted at S260 to the remote insured party device.

According to some embodiments, the system may receive an adjustment of at least one real world element from the remote insured party device. The system may then transmit data indicative of the real world element adjustment to the virtual home database system. For example, a user might indicate that he or she has purchased a different model washing machine and that information may be stored by the system for later reference. The adjustment might be associated with, for example, an image of the real world element, a video of the real world element, an automatically created location of the real world element, and/or a date or time associated with the real world element. Note that, as used herein the term "adjustment" might include the addition or deletion of a real world element. Further, according to some embodiments, the virtual home platform is in communication with a claims processing system and the rendering of the virtual home includes an exchange of information between the virtual home platform and the claims processing system. For example, a rendering of a real world element might indicate a date on which a claim was last paid in connection with that element.

Figure 3:
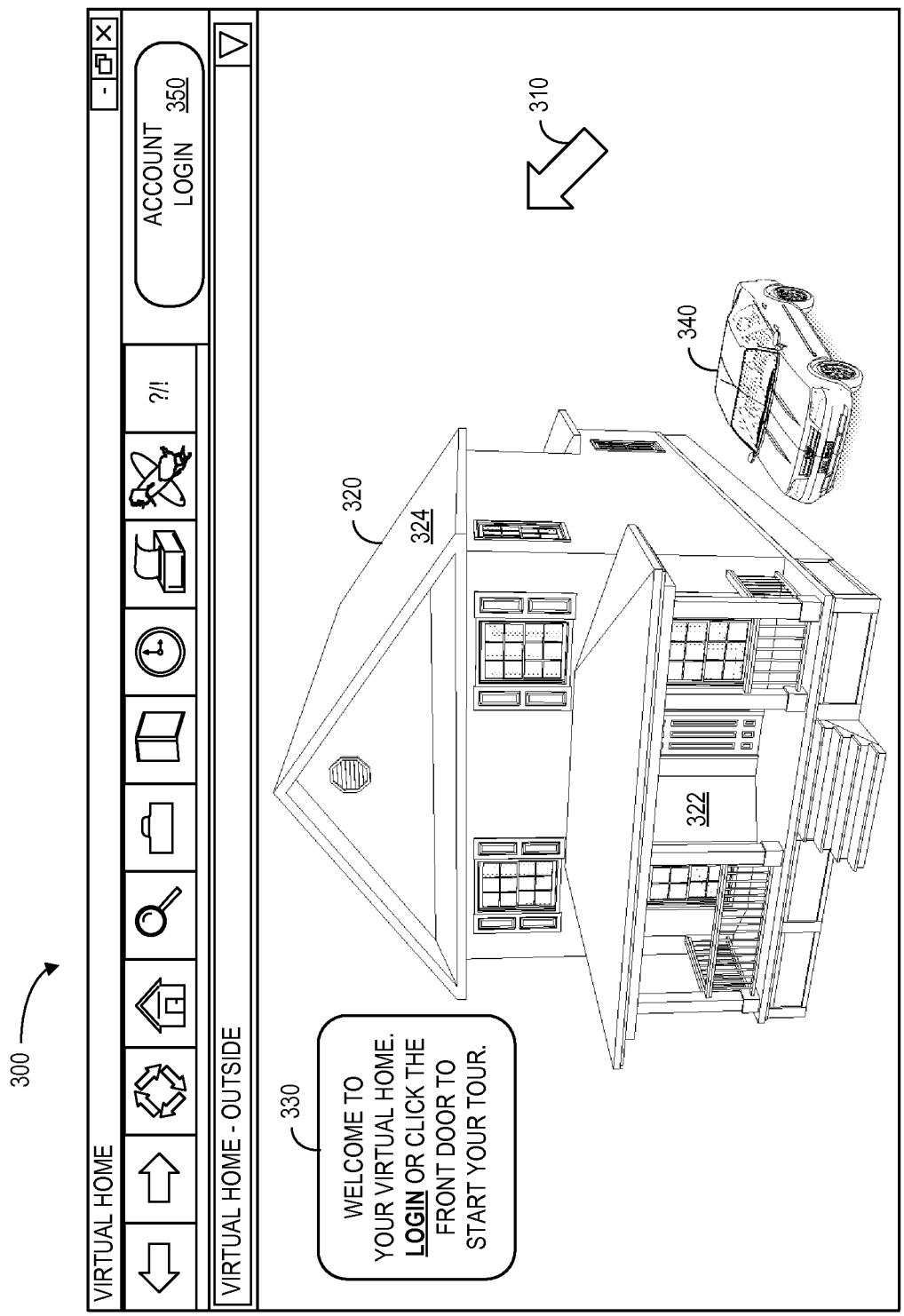
FIGS. 3 and 4 illustrate virtual home outside displays in accordance with some embodiments.
Figure 4:
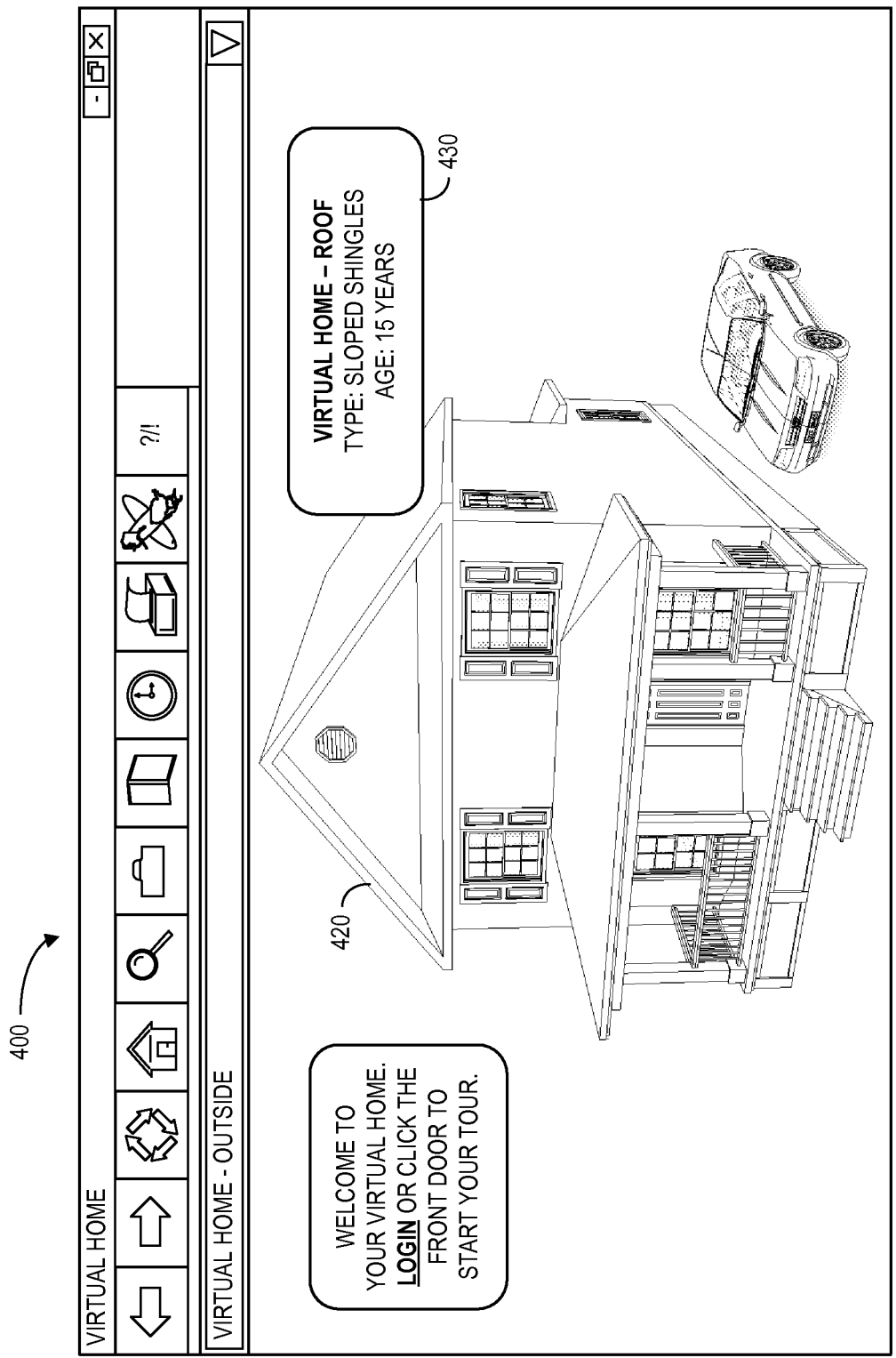

By way of example, FIGS. 3 and 4 illustrate virtual home outside displays in accordance with some embodiments. In particular, FIG. 3 illustrates a virtual home outside display 300 that might be interacted with using a touchscreen or computer pointing icon 310. The outside display 300 includes a picture of a virtual home 320 in accordance with some embodiments. The outside display 300 also includes instructions 330 indicating that a user may login to the virtual home system via an icon 350. The login process might be performed, for example, by an authentication module. The authentication module may, according to some embodiments verify authentication information from the user, such as a username and password, biometric information, a telephone number, a ZIP code, social media site information, and/or an insurance policy identifier. Once the user is authenticated, his or her insurance policy information, data about his or her personal possessions, etc. may then be used to render the virtual home 320. Note that the account login icon 350 might invite the user to access the system via a guest account, a policyholder login, etc.

According to some embodiments, the instructions might indicate that selection of a front door area 322 will initiate a tour of the virtual home 320 (e.g., taking the user inside and throughout the virtual home 320). If this is performed without the user being authenticated, the virtual home system might arrange for generic real world elements to be provided to the remote insured party device (e.g., items that are typically found in a three bedroom home might be automatically populated in the virtual home 320).

According to some embodiments, the outdoor display may have been initially selected by the user (e.g., he or she might select a picture that most closely matches the real-world home from a set of potential pictures). According to other embodiments, a picture taken with the user's smartphone might be used to create virtual home 320. According to still other embodiments, the virtual home 320 might be automatically selected and/or populated by the system based on publically available information (e.g., it might be known that a particular home at a particular address was built by a developer who always used shingle roofing material).

According to some embodiments, additional real world elements outside the virtual home 320 may also be included in the outdoor display 300, such as trees, a playset, a trampoline, and/or an automobile 340. In this case, the user might select those elements to provide more information about them and/or to receive additional insurance information in connection with his or selections.

In addition, according to some embodiments, the user might select portions of the virtual home 320 to provide more information about them and/or to receive additional insurance information in connection with his or selections. For example, the user might select a roof portion 324 of the virtual home with the computer pointing icon 310. FIG. 4 illustrates a virtual home outside display 400 that might be provided after such an interaction. In this case, a virtual home 420 includes supplemental insurance information 430 about the roof, such as the type of roof, the age of the roof, etc. Such additional information might be associated with roof valuation information, which may vary based on the state and/or age of the roof. For example, a roof over 20 years old may have a scheduled valuation based on a table that indicates for each type of roof type (tile, asphalt shingle, etc.) and, an appropriate percentage of the replacement cost that may be paid. A shingle roof at 20 years of age might only be covered for 40% of its replacement cost. A roof which has Actual Cash Value ("ACV") coverage, for example, may be covered for replacement cost minus a depreciation that is determined only at the time a claim is filed. As a result, it may be less clearly defined or understandable for the insured party to know how much they will be covered for at time of loss. A roof with Replacement Cost ("RC") coverage may be covered for full replacement value. In this case, the outside display 400 might indicate that ACV insurance only currently provides coverage for 40% of the replacement cost for the roof, which will continue to diminish at 3% a year bottoming out at 25% coverage. The outside display 400 might also indicate that optional RC coverage would provide 100% of replacement cost regardless of the age of roof for an additional premium cost.

Figure 5:
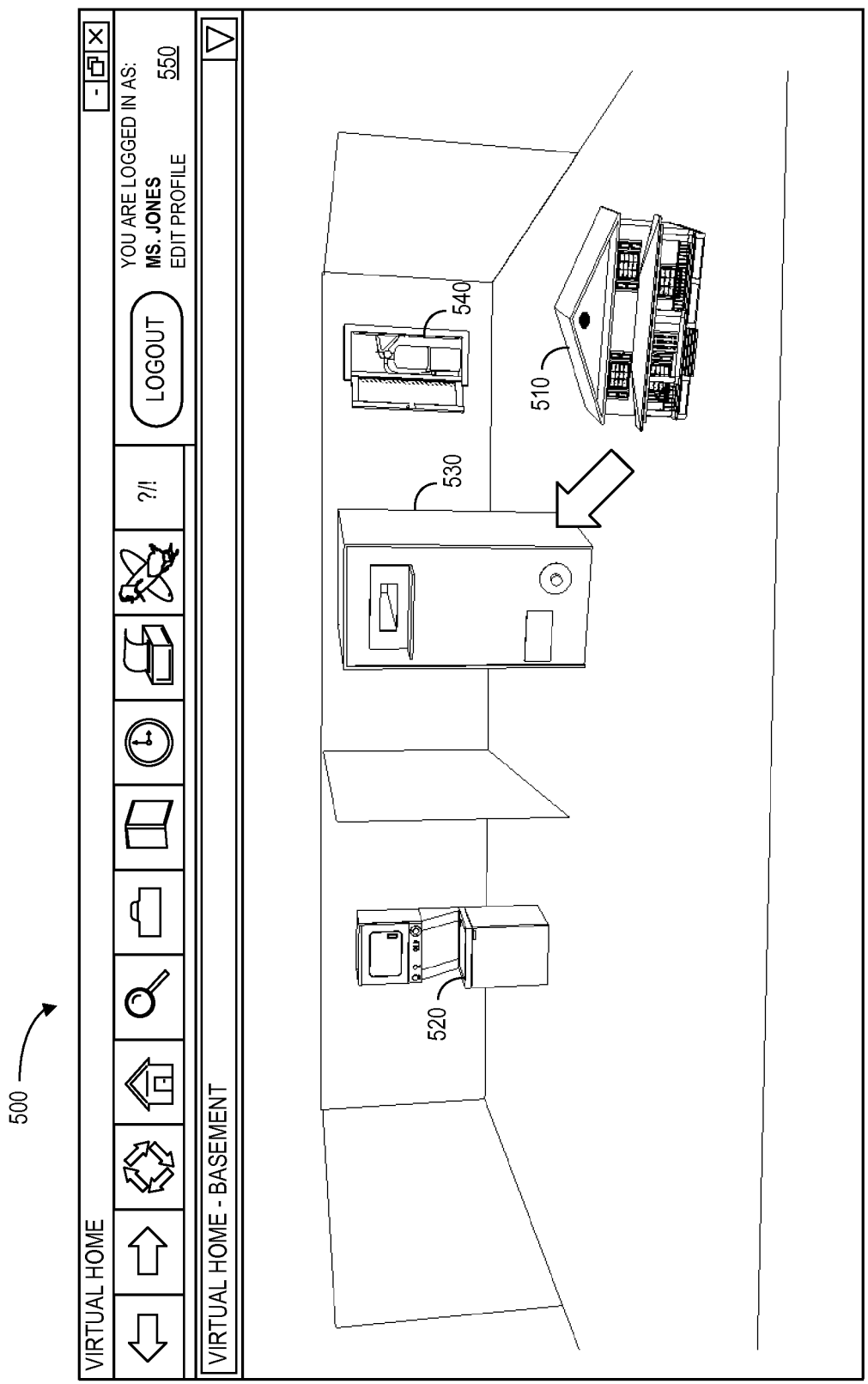
FIGS. 5 and 6 illustrate virtual home basement displays in accordance with some embodiments.
Figure 6:
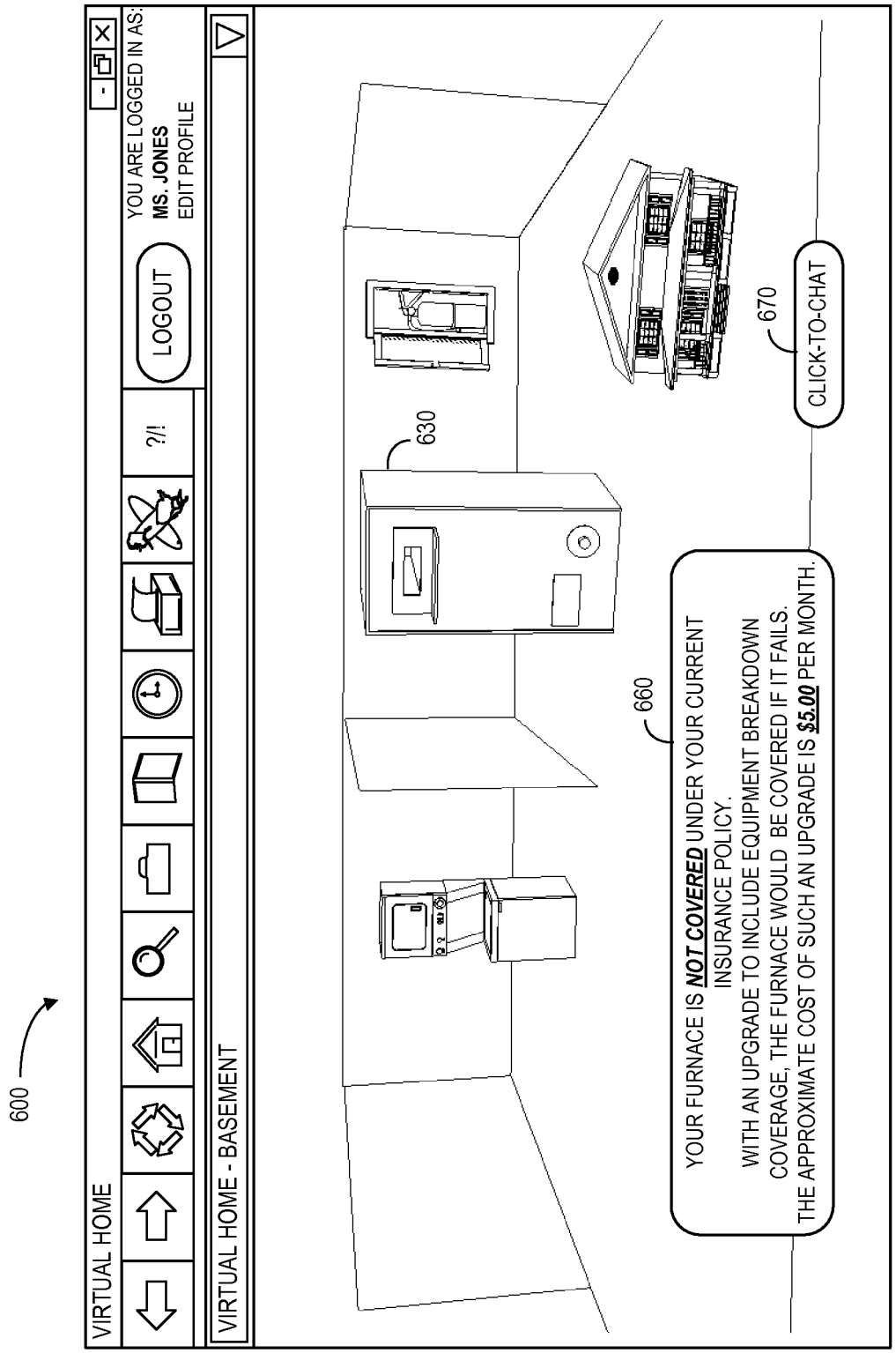

FIGS. 5 and 6 illustrate virtual home basement displays in accordance with some embodiments. In particular, FIG. 5 illustrates a virtual home basement display 500 that includes a picture of the room along with real world elements within the room. The basement display illustrated in FIG. 5, for example, includes a washer/dryer 520 (e.g., that may be associated with water damage), a furnace 530, and a fire extinguisher 540 (e.g., that might qualify the homeowner for an insurance discount). According to some embodiments, the display 500 includes a home model 510 or floorplan to let the user navigate to other rooms within the virtual home. Moreover, according to some embodiments, a user may be able to add new real world elements, remove elements, and/or update information about elements, helping him or her maintain an accurate and current inventory of his or her real world home. For example, a user might add a manufacturer and model number to the furnace 530 and automatically receive push notification when a manufacturer-recommend maintenance event occurs (e.g., "it is time to have your furnace cleaned by a professional"). According to some embodiments, the display might further include an account logout option and/or an area to edit a user's profile 550 (e.g., to let the user provide an acknowledgement and/or manage his or her online account settings).

According to some embodiments, a user might select real world elements within the virtual home basement display 500 to provide more information about them and/or to receive additional insurance information in connection with his or selections. For example, the user might select the furnace 530 of the virtual home basement display 500 with the computer pointing icon. FIG. 6 illustrates a virtual home basement display 600 that might be provided after such an interaction. In this case, supplemental information 660 about the furnace 630 is displayed. The supplemental information 660 might, for example, be associated with Equipment Breakdown ("EB") protection. The system might indicate, for example, that the homeowner has "no coverage" for mechanical or electrical breakdown for home systems and appliances (e.g., furnaces, central air, electronics, etc.). A recommendation might be provided asking the homeowner to consider the purchase of EB insurance as an optional coverage for an additional $10 per month. The system might also recommend the addition of service line coverage to the EB insurance, providing coverage for the utility, sewer, and/or water lines coming into the home for breaks, root invasions, etc. for an additional $20.

Note that the particular types of supplemental insurance information 660 provided herein are only examples, and the supplemental insurance information 660 might include any other types of data. For example, the supplemental insurance information 660 might include testimonial information (e.g., from satisfied customers in the homeowner's neighborhood), prior claim information (e.g., associated with the homeowner or people who owned similar types of homes), insurance upgrade information, flood insurance, earthquake insurance, water, sewer back up or sump overflow damage, liability limits, and/or umbrella insurance coverages.

For example, for a home located in a flood zone, the virtual home might identify the need for flood insurance, and provide the opportunity to link to an insurance enterprise flood department to submit a request for an insurance premium quote. For a virtual home where the insurance policy liability limits are, for example, only $100,000 and homeowner has a dog, the display 600 might recommend higher liability limits (e.g., $300,000 or $500,000). The display 600 might also recommend umbrella insurance coverage if the homeowner also has automobile insurance with the same insurer along with information about how common liability claims are for dog related events, particularly bites. According to some embodiments, the system might automatically determine that the virtual home lacks a mortgagee (indicating that there may be high equity in the home to protect) in connection with a Personal Umbrella Policy ("PUP") insurance recommendation.

According to some embodiments, the supplemental insurance information 660 comprises "drill-down information" that might be associated with, for example, valuable articles (e.g., associated with the theft of jewelry, watches, furs, precious stones, or semi-precious stones). For example, the supplemental insurance information 660 might indicate a sub-limit of $1,500 for the theft of jewelry, watches, furs, precious stones, and semi-precious stones and note that a mysterious disappearance and/or simply losing an item is not covered at all. The system may recommend two options: (1) Blanket Valuable Articles ("BVA") providing protection for all items up to $10,000 per item and a total of $50,000 without the need of submitting appraisals (this coverage might include, for example, mysterious disappearance and has no deductible); and (2) Scheduled Valuable Articles ("SVA") which gives the homeowner an opportunity to specifically lists items and have them covered for an agreed amount, meaning at the time of loss the insurer will simply pay the amount scheduled in the insurance policy (an appraisal may be required for this type of insurance to enable a homeowner to schedule unique articles or high value items.)

As another example, the supplemental insurance information 660 might be associated with personal property causes of loss and/or named perils coverage for contents. This type of insurance may be poorly understood by insureds or not at all realized. As a drill down, this supplemental insurance information 600 may provide an opportunity to educate the insured on what types of losses his or her covered property is covered for and recommend consideration of an insurance upgrade instead to obtain open perils coverage (and some of the key differences may be highlighted).

As still another example, the supplemental insurance information 660 might be associated with worldwide personal property coverage. That is, the system might highlight that type of insurance provides coverage for personal property and applies anywhere in the world (so if the homeowner is traveling abroad and is robbed, the coverage still applies). With respect to other coverages limits, the supplementation insurance information 660 might display the property with other potential structures, fences, etc., which would be clickable for drill downs to illustrate and/or explain how the policy covers them. There might also be drill downs on electronics elements depicted in the virtual home, like computers, etc., and in appliances, such as those associated with the Internet of Things ("IoT") showing existing limitations in the policy for different types of cause of loss and illustrating and/or explaining the options available to get coverage for some of the perils unique to electronics, such as power surge damage and electrical injury. There could be a clickable drill down on a real world refrigerator element in a kitchen (or garage) display to explain the coverage in the policy for refrigerated items (either in a package or offering the option) as well as how losses under $500 won't alter their premium (which most refrigerated items losses alone are). The supplemental insurance information 660 might be associated with associated with loss assessment insurance. Homes and condominiums may be associated with a homeowner's associations such that the homeowner is liable for an assessment due to a liability or common property claim (e.g., in connection with a pool house or community center). A base policy might, for example, only cover $1,000 while an upgrade package includes $10,000 of coverage.

According to some embodiments, the display 600 includes a "click-to-chat" icon 670. The user might, for example, select the icon 670 so that the system will receive from the remote insured party device a request to communicate. Responsive to the received request to communicate, the system might facilitate communication with the homeowner. For example, a customer service representative or insurance agent might answer the homeowner's questions and/or arrange for the sale of additional insurance products as appropriate. According to some embodiments, the communication is associated with a virtual agent that automatically generates recommendations for the first insured party based on, for example, demographic information, geographic information, income information, age information, gender information, a home value, and/or an average amount of insurance protection associated with other insured parties.

Figure 7:
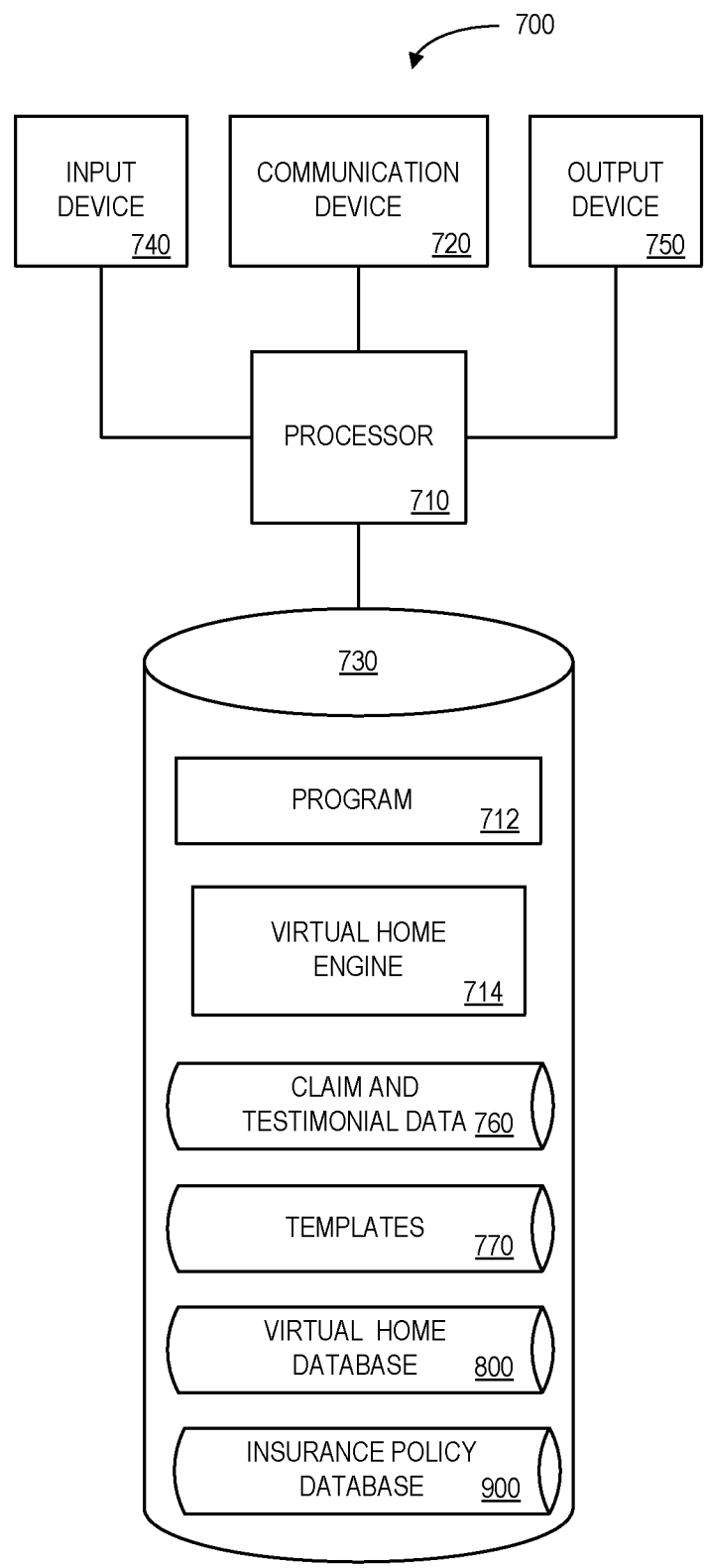
FIG. 7 is block diagram of a virtual home tool or platform according to some embodiments of the present invention.

The embodiments described herein may be implemented using any number of different hardware configurations. For example, FIG. 7 illustrates a virtual home platform 700 that may be, for example, associated with the system 100 of FIG. 1. The virtual home platform 700 comprises a processor 710, such as one or more commercially available Central Processing Units (CPUs) in the form of one-chip microprocessors, coupled to a communication device 720 configured to communicate via a communication network (not shown in FIG. 7). The communication device 720 may be used to communicate, for example, with one or more remote insured party devices. Note that communications exchanged via the communication device 720 may utilize security features, such as those between a public intern& user and an internal network of the insurance enterprise. The security features might be associated with, for example, web servers, firewalls, and/or PCI infrastructure. The virtual home platform 700 further includes an input device 740 (e.g., a mouse and/or keyboard to enter information about supplemental insurance information) and an output device 750 (e.g., to output reports regarding system administration and/or insurance policies).

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or a virtual home engine or application 714 for controlling the processor 710. The processor 710 performs instructions of the programs 712, 714, and thereby operates in accordance with any of the embodiments described herein. For example, the processor 710 may automatically associated a first insured party with first virtual home information including real world elements of a virtual home. The first virtual home information may also be automatically associated with first insurance policy information of the first insured party. A virtual home display request may be received by the processor 710 from a remote insured party device associated with the first insured party. Responsive to the received virtual home display request, a rendering of at least a portion of the virtual home may be automatically facilitated by the processor 710 based on the first virtual home information, including at least some of the real world elements, and the first insurance policy information. A selection of one of the real world elements may be received the processor 710 the processor 710 from the remote insured party device, and, responsive to the selected real world element, supplemental insurance information may be transmitted to the remote insured party device.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the virtual home platform 700 from another device; or (ii) a software application or module within the virtual home platform 700 from another software application, module, or any other source.

In some embodiments (such as shown in FIG. 7), the storage device 730 includes claim and testimonial data 760 (e.g., associated with past claims, damages, etc.), templates 770 (e.g., containing common pre-configured virtual homes), a virtual home database 800, and an insurance policy database 900. An example of databases that may be used in connection with the virtual home platform 700 will now be described in detail with respect to FIGS. 8 and 9. Note that the databases described herein are only examples, and additional and/or different information may be stored therein. Moreover, various databases might be split or combined in accordance with any of the embodiments described herein. For example, the templates 770 and/or virtual home database 800 might be combined and/or linked to each other within the virtual home engine 714.

Referring to FIG. 8, a table is shown that represents the virtual home database 800 that may be stored at the virtual home platform 700 according to some embodiments. The table may include, for example, entries identifying virtual homes. The table may also define fields 802, 804, 806, 808, 810 for each of the entries. The fields 802, 804, 806, 808, 810 may, according to some embodiments, specify: a virtual home identifier 802, an associated insurance policy identifier 804, a room 806, an item 808, and supplemental information 810. The virtual home database 800 may be created and updated, for example, based on information electrically received from a homeowner and/or that is automatically determined and/or predicted by an insurance enterprise.

The virtual home identifier 802 may be, for example, a unique alphanumeric code identifying a virtual home. The associated insurance policy identifier 804 may indicate, for example, an existing insurance policy that covers the actual home represented by the virtual home. The room 806 and the item 808 may define the real world elements that exist within the virtual home. For example, as illustrated by FIG. 8, the basement of virtual home identifier "VH_1001" includes a washer/dryer, furnace, and fire extinguisher. The supplemental information 810 may provide additional insurance information about the virtual home (e.g., available upgrades, discounts, push notifications, etc.).

Figure 9:
FIG. 9 is a tabular portion of an insurance policy database according to some embodiments.

Referring to FIG. 9, a table is shown that represents the insurance policy database 900 that may be stored at the virtual home platform 700 according to some embodiments. The table may include, for example, entries identifying insurance policies. The table may also define fields 902, 904, 906, 908, 910 for each of the entries. The fields 902, 904, 906, 908, 910 may, according to some embodiments, specify: an insurance policy identifier 902, a virtual home identifier 904, a coverage date 906, claims 908, and an indication of equipment breakdown coverage 910. The insurance policy database 900 may be created and updated, for example, based on information electrically received from a homeowner and/or that is automatically determined and/or predicted by an insurance enterprise.

The insurance policy identifier 902 may indicate, for example, an existing insurance policy that covers the actual home represented by the virtual home and may be based on, or associated with, the associated insurance policy identifier 804 in the virtual home database 800. The virtual home identifier 904 may be, for example, a unique alphanumeric code identifying a virtual home and may be based on, or associated with, the virtual home identifier 802 in the virtual home database 800. The coverage date might indicate when the insurance policy became effective and the claims 908 might indicate one or more claims that have been filed in connection with the insurance policy (and might be used, for example, to supplement display of room of the virtual room where the claim occurred). The equipment breakdown coverage 910 might indicate whether or not the homeowner has purchased an insurance upgrade (and may be used, for example, to make an upsell recommendation to the homeowner via the virtual home display).

Figure 10:
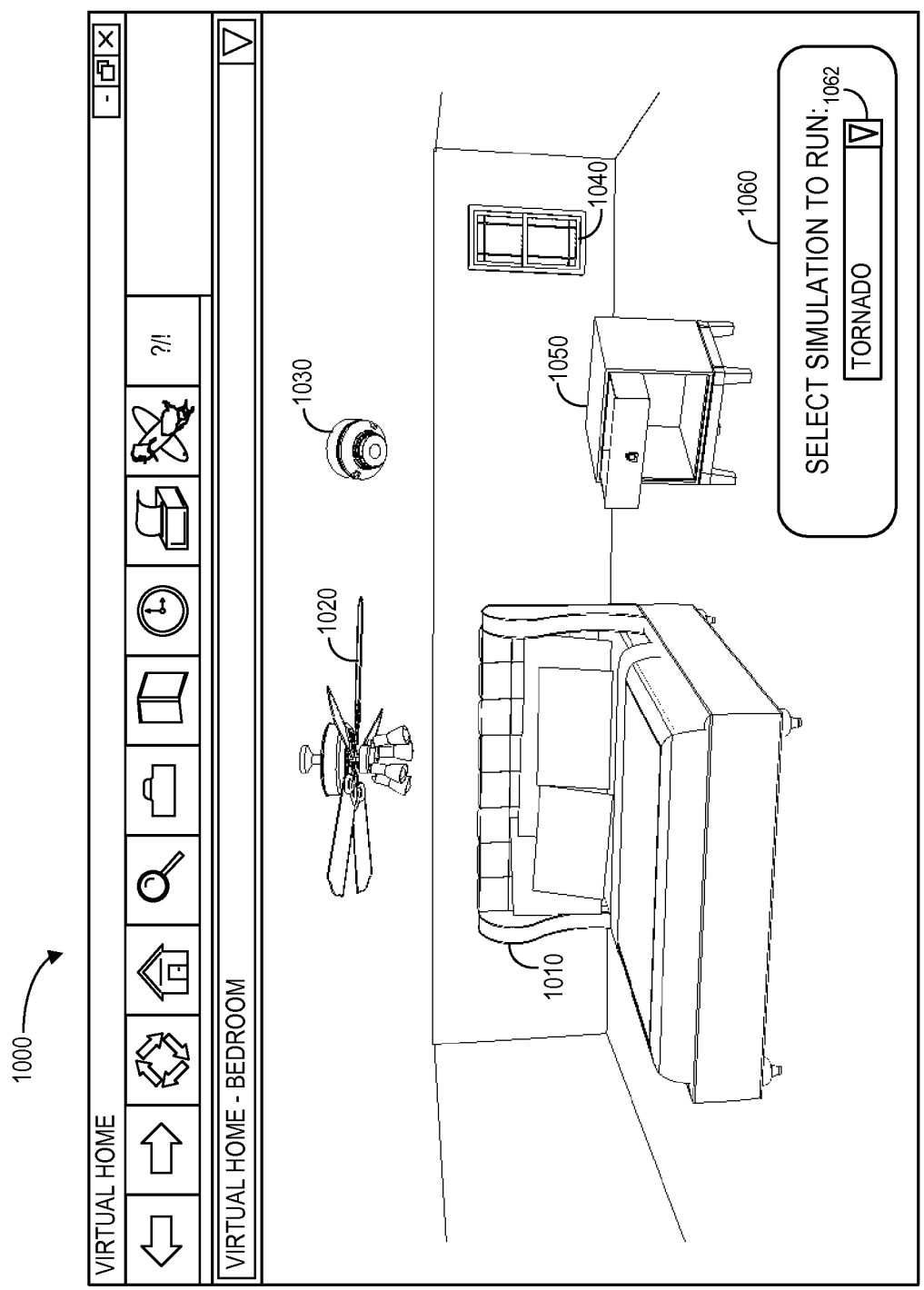
FIGS. 10 and 11 illustrate virtual home bedroom displays in accordance with some embodiments.
Figure 11:
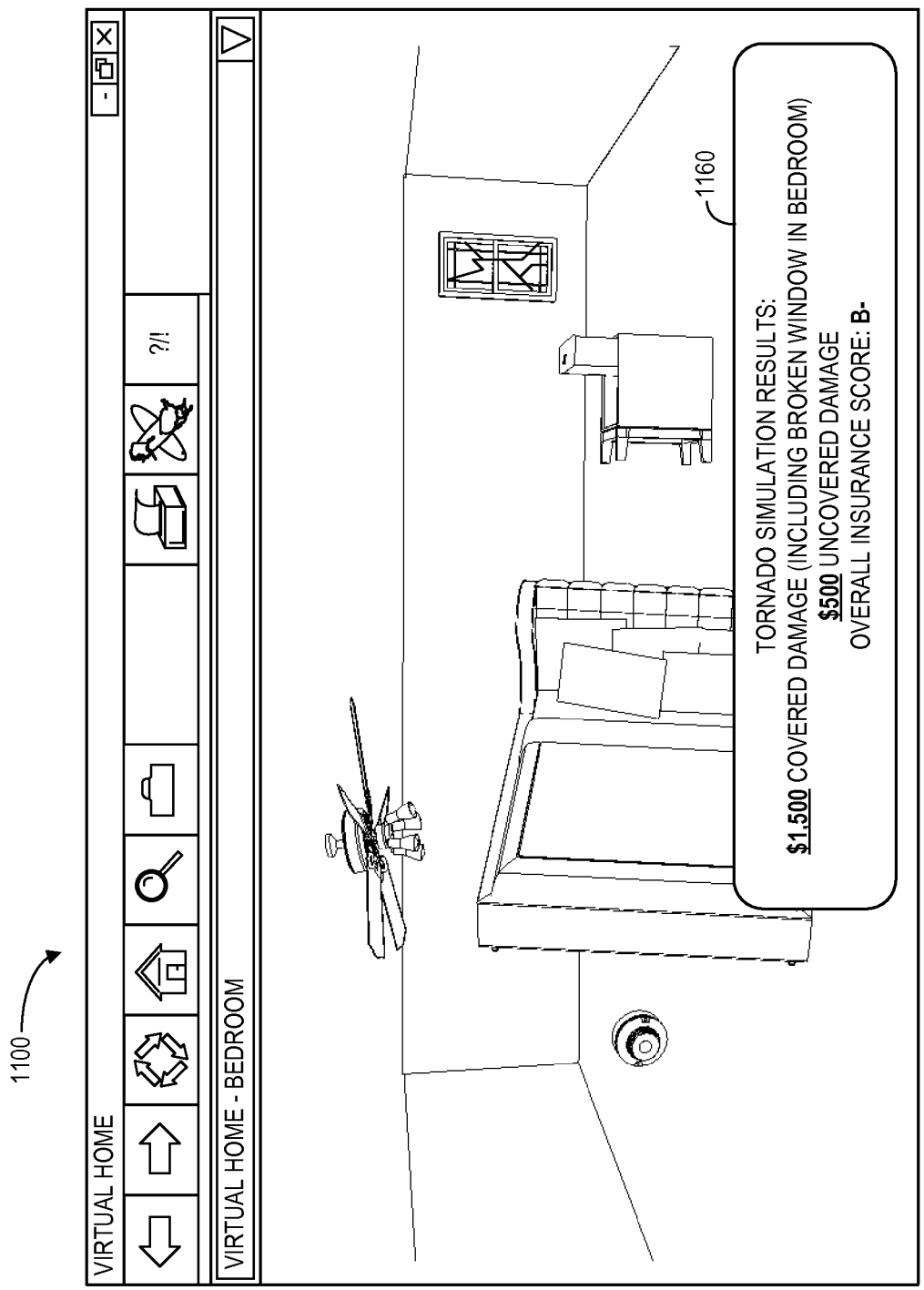

FIGS. 10 and 11 illustrate virtual home bedroom displays in accordance with some embodiments. In particular, FIG. 10 illustrates a virtual home bedroom display 1000 including a bed 1010, a ceiling fan and light 1020, a smoke detector 1030 (e.g., which might be associated with supplemental insurance information offering a discount and/or push notifications to remind the homeowner to check the batteries of the smoke detector 1030), a window 1040 (e.g., which might be associated with supplemental insurance information offering a discount for a home security system), and a nightstand 1050 (e.g., which might be associated with supplemental insurance information about protecting jewelry from the risk of theft).

According to some embodiments, information about a virtual home might be used to execute a "simulation" to predict an impact of an event in connection with a homeowner's insurance policy. In particular, the homeowner might access a simulation selection area 1060 of the display 1000 and use a drop-down menu 1062 to select a type of event to be simulated (e.g., a fire, a flood, a hurricane, hail, tornado, a cyber-crime event, damage from at least a portion of a tree falling, a broken pipe, an electrical power surge, etc.). Responsive to the received request to execute a simulation, the system may execute the simulation (e.g., based on past events for similar types of homes in the area and/or similar types of insurance policies) and display a result of the simulation to the homeowner. For example, FIG. 11 illustrates a virtual home bedroom display 1100 including a simulation result 1160 that has caused damages to the real world items within the room. The simulation result 1160 might indicate, for example, an amount of damages that were covered by the homeowner's insurance policy along with an amount of damages that were not covered by the policy (e.g., along with a suggest improvement to the homeowner's current level of protection). According to some embodiments, the simulation result 1160 further includes an insurance protection score, which might be a letter grade, a numerical value, a label, a color, etc.

Figure 12:
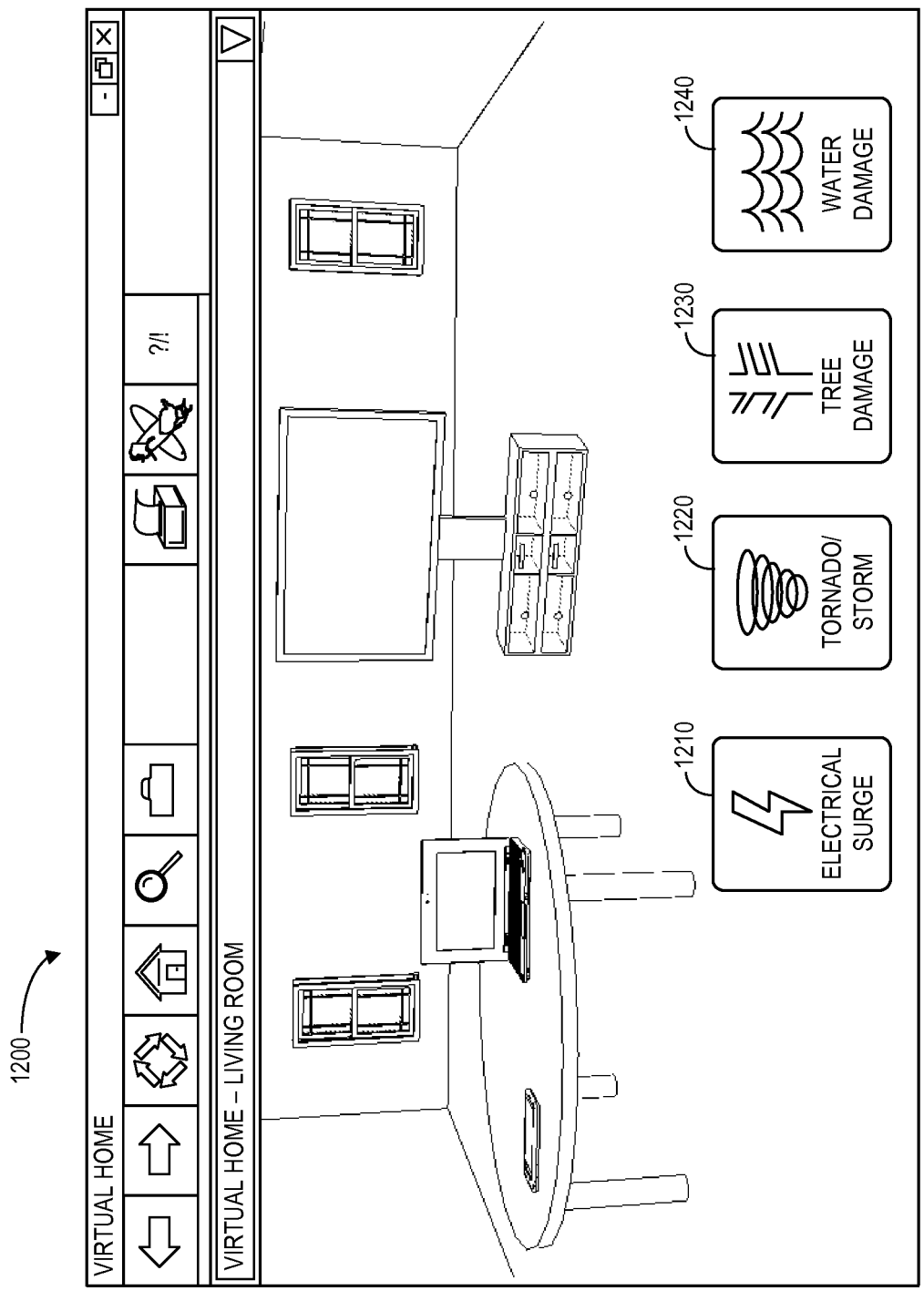
FIGS. 12 and 13 illustrate virtual home living room display in accordance with some embodiments.
Figure 13:
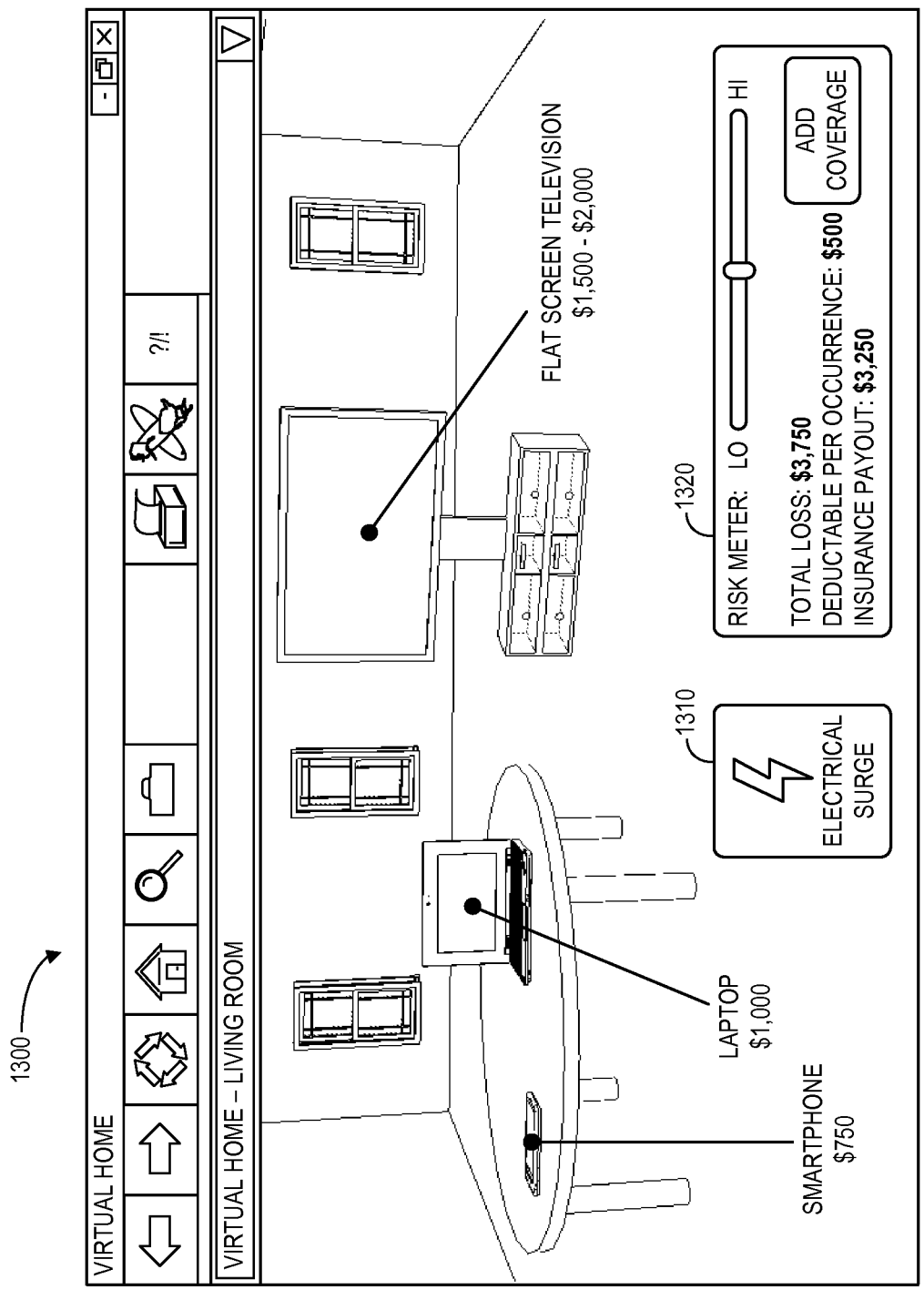

FIGS. 12 and 13 illustrate virtual home living room displays in accordance with some embodiments. In particular, FIG. 12 illustrates a virtual home living room display 1200 including electrical components, such as a flat screen television, laptop computer, and smart phone. According to some embodiments, information about a virtual home might be used to execute on of a number of pre-packaged simulations to predict an impact of an event in connection with a homeowner's insurance policy. In particular, the homeowner might access an electrical surge icon 1210, a tornado/storm icon 1220, a tree damage icon 1230, and/or a water damage icon 1240 to select a type of event to be simulated. Responsive to the received request to execute a simulation, the system may execute the simulation (e.g., based on past events for similar types of homes in the area and/or similar types of insurance policies) and display a result of the simulation to the homeowner. For example, FIG. 13 illustrates a virtual home living room display 1300 including an electrical surge 1310 simulation result 1320 that has caused damages to the real world items within the room. The display 1300 might, for example, initially display sparks and/or smoke rising from the electrical components in the room. The simulation result 1320 might indicate, for example, an amount of damages that were covered by the homeowner's insurance policy along with an amount of damages that were not covered by the policy (e.g., along with a suggest improvement to the homeowner's current level of protection). According to some embodiments, the simulation result 1320 further includes a graphical insurance risk meter displaying an amount of risk currently assumed by the user, an offer to purchase additional coverage, etc. According to some embodiments, the display 1300 might further illustrate to a user what a cleanup procedure would involve (e.g., in the case of water damage) and/or video testimonials explaining how other customers were protected. Note that the display 1300 might also let a user see statistical data collected for similar homes and/or real world items. For example, based on demographic information and/or information about his or home, the display 1300 could provide personalized data explaining what a normal or typical loss experience might include.

Figure 14:
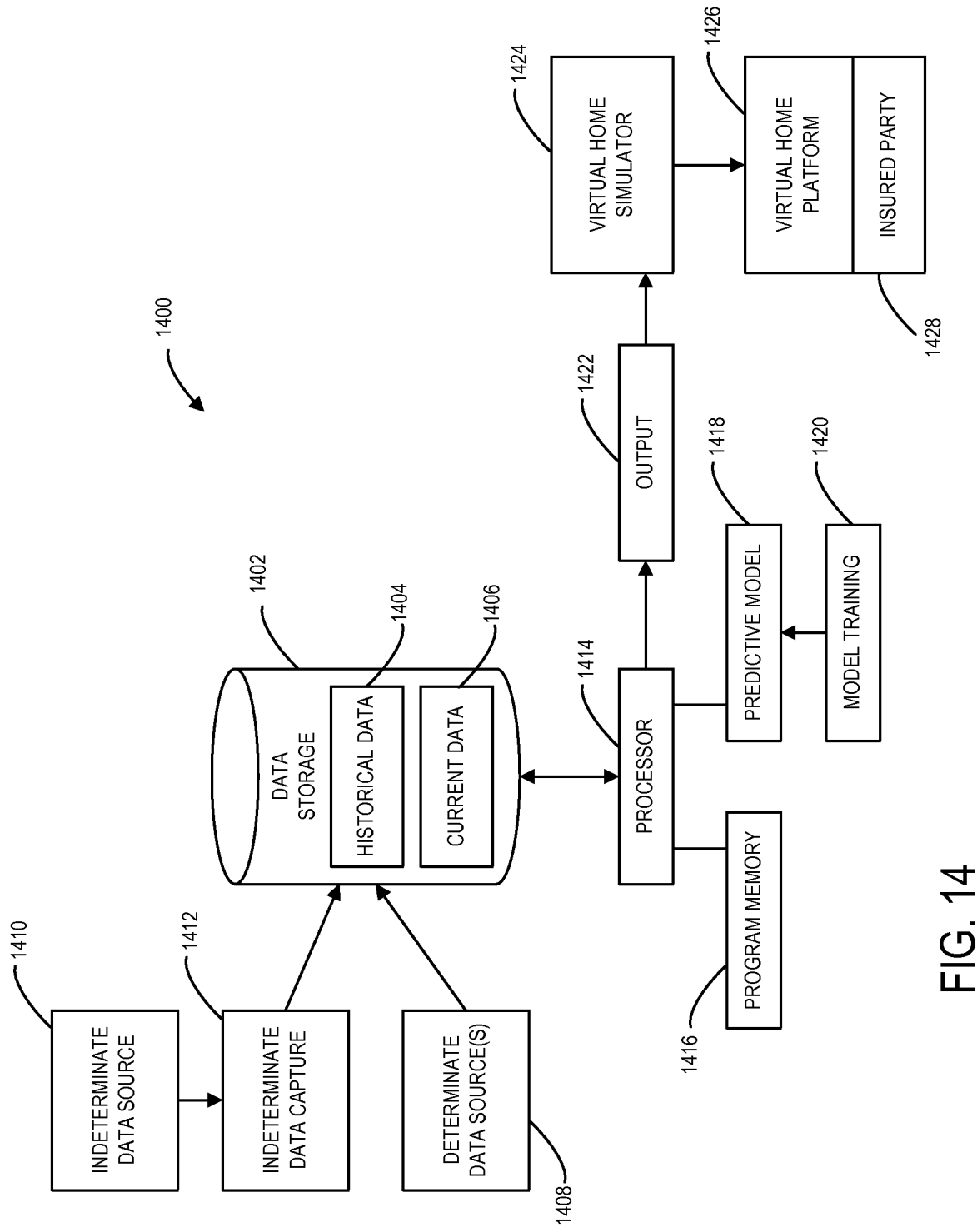
FIG. 14 illustrates a system associated with a predictive model according to some embodiments

According to some embodiments, one or more predictive models may be used to simulate an event to predict damage based on prior events and claims. Features of some embodiments associated with a predictive model will now be described by first referring to FIG. 14. FIG. 14 is a partially functional block diagram that illustrates aspects of a computer system 1400 provided in accordance with some embodiments of the invention. For present purposes it will be assumed that the computer system 1400 is operated by an insurance company (not separately shown) for the purpose of supporting event simulations for a virtual home.

The computer system 1400 includes a data storage module 1402. In terms of its hardware the data storage module 1402 may be conventional, and may be composed, for example, by one or more magnetic hard disk drives. A function performed by the data storage module 1402 in the computer system 1400 is to receive, store and provide access to both historical claim transaction data (reference numeral 1404) and current claim transaction data (reference numeral 1406). As described in more detail below, the historical claim transaction data 1404 is employed to train a predictive model to provide an output that indicates hail history data, and the current claim transaction data 1406 is thereafter analyzed by the predictive model. Moreover, as time goes by, and results become known from processing current claim transactions, at least some of the current claim transactions may be used to perform further training of the predictive model. Consequently, the predictive model may thereby adapt itself to changing event impacts and damage amounts.

Either the historical claim transaction data 1404 or the current claim transaction data 1406 might include, according to some embodiments, determinate and indeterminate data. As used herein and in the appended claims, "determinate data" refers to verifiable facts such as the an age of a home; a home type; an event type (e.g., fire or flood); a date of loss, or date of report of claim, or policy date or other date; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files. Indeterminate data extracted from medical notes or accident reports might be associated with, for example, an amount of loss and/or details about damages.

The determinate data may come from one or more determinate data sources 1408 that are included in the computer system 1400 and are coupled to the data storage module 1402. The determinate data may include "hard" data like a claimant's name, date of birth, social security number, policy number, address; the date of loss; the date the claim was reported, etc. One possible source of the determinate data may be the insurance company's policy database (not separately indicated). Another possible source of determinate data may be from data entry by the insurance company's claims intake administrative personnel.

The indeterminate data may originate from one or more indeterminate data sources 1410, and may be extracted from raw files or the like by one or more indeterminate data capture modules 1412. Both the indeterminate data source(s) 1410 and the indeterminate data capture module(s) 1412 may be included in the computer system 1400 and coupled directly or indirectly to the data storage module 1402. Examples of the indeterminate data source(s) 1410 may include data storage facilities for document images, for text files (e.g., claim handlers' notes) and digitized recorded voice files (e.g., claimants' oral statements, witness interviews, claim handlers' oral notes, etc.). Examples of the indeterminate data capture module(s) 1412 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, claim handlers' opinions may be extracted from their narrative text file notes.

The computer system 1400 also may include a computer processor 1414. The computer processor 1414 may include one or more conventional microprocessors and may operate to execute programmed instructions to provide functionality as described herein. Among other functions, the computer processor 1414 may store and retrieve historical claim transaction data 1404 and current claim transaction data 1406 in and from the data storage module 1402. Thus the computer processor 1414 may be coupled to the data storage module 1402.

The computer system 1400 may further include a program memory 1416 that is coupled to the computer processor 1414. The program memory 1416 may include one or more fixed storage devices, such as one or more hard disk drives, and one or more volatile storage devices, such as RAM devices. The program memory 1416 may be at least partially integrated with the data storage module 1402. The program memory 1416 may store one or more application programs, an operating system, device drivers, etc., all of which may contain program instruction steps for execution by the computer processor 1414.

The computer system 1400 further includes a predictive model component 1418. In certain practical embodiments of the computer system 1400, the predictive model component 1418 may effectively be implemented via the computer processor 1414, one or more application programs stored in the program memory 1416, and data stored as a result of training operations based on the historical claim transaction data 1404 (and possibly also data received from a third party weather reporting service). In some embodiments, data arising from model training may be stored in the data storage module 1402, or in a separate data store (not separately shown). A function of the predictive model component 1418 may be to determine appropriate simulation models, results, and/or scores. The predictive model component may be directly or indirectly coupled to the data storage module 1402.

The predictive model component 1418 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 1400 includes a model training component 1420. The model training component 1420 may be coupled to the computer processor 1414 (directly or indirectly) and may have the function of training the predictive model component 1418 based on the historical claim transaction data 1404 and/or information about weather and other types of events. (As will be understood from previous discussion, the model training component 1420 may further train the predictive model component 1418 as further relevant data becomes available.) The model training component 1420 may be embodied at least in part by the computer processor 1414 and one or more application programs stored in the program memory 1416. Thus the training of the predictive model component 1418 by the model training component 1420 may occur in accordance with program instructions stored in the program memory 1416 and executed by the computer processor 1414.

In addition, the computer system 1400 may include an output device 1422. The output device 1422 may be coupled to the computer processor 1414. A function of the output device 1422 may be to provide an output that is indicative of (as determined by the trained predictive model component 1418) particular simulation results, scores, and upsell recommendations. The output may be generated by the computer processor 1414 in accordance with program instructions stored in the program memory 1416 and executed by the computer processor 1414. More specifically, the output may be generated by the computer processor 1414 in response to applying the data for the current simulation to the trained predictive model component 1418. The output may, for example, be a monetary estimate and/or likelihood within a predetermined range of numbers. In some embodiments, the output device may be implemented by a suitable program or program module executed by the computer processor 1414 in response to operation of the predictive model component 1418.

Still further, the computer system 1400 may include a virtual home simulator module 1424. The virtual home simulator module 1424 may be implemented in some embodiments by a software module executed by the computer processor 1414. The virtual home simulator module 1424 may have the function of rendering a portion of the display on the output device 1422. Thus the virtual home simulator module 1424 may be coupled, at least functionally, to the output device 1422. In some embodiments, for example, the virtual home simulator module 1424 may direct workflow by referring, to a virtual home platform 1426, current simulation results generated by the predictive model component 1418 and found to be associated with various results or scores. In some embodiments, these current simulations may be provided to an insured party 1428 who may also be offered insurance upgrades as appropriate.

Thus, embodiments may provide an automated and efficient way to facilitate an exchange of information between an insurer and an insured party. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with a virtual home might be implemented as an augmented reality display and/or the databases described herein may be combined or stored in external systems).

Figure 15:
FIG. 15 illustrates a virtual home display on a portable device in accordance with some embodiments.

Moreover, although embodiments have been described with respect to a person who owns his or her home, embodiments may instead be associated with a business (in which case, the virtual home may refer to a commercial location). In addition, some or all of the information described herein might be shared (e.g., manually or automatically) via a social media platform, such as by posting an event simulation result to a social media account. Still further, the displays and devices illustrated herein are only provided as examples, and embodiments may be associated with any other types of user interfaces. For example, FIG. 15 illustrates a handheld virtual home display 1500 according to some embodiments.

Note that the present invention provides significant technical improvements to facilitate an exchange of information between an insurer and an insured party. The present invention is directed to more than merely a computer implementation of a routine or conventional activity previously known in the industry as it significantly advances the technical efficiency, access and/or accuracy of communications between an insurer and an insured party by implementing a specific new method and system as defined herein. The present invention is a specific advancement in the areas of insurer/insured communication by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized insurance, client and/or third party real estate systems, networks and subsystems. For example, in the present invention information may be transmitted from an insurer to an insured party in an easy to comprehend manner and/or valuable and helpful information about an insured party may be analyzed and accurately and automatically collected by an insurance enterprise.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system associated with an insurance enterprise, the system comprising:
   a virtual home database system to store, for each of a plurality of insured parties, virtual home information including real world elements of a virtual home;
   an insurance provider backend system having access to, for each of the plurality of insured parties, insurance policy information associated with the insurance enterprise; and
   a virtual home platform, communicatively coupled to the virtual home database system and the insurance provider backend system, including:
      a communication device to receive, from a remote insured party device associated with a first insured party, at least one electronic message including authentication information and an associated virtual home display request,
      an authentication module configured to:
         verify the authentication information in the at least one electronic message;
         responsive to failure to verify the authentication information, generate, for provision to the remote insured party device, a graphical user interface including a generic rendering of one of at least a portion of an exterior and an interior of a generic virtual home, said generic rendering including selectable generic elements automatically populated into the generic rendering, and
         responsive to a positive verification of the authentication information:
            generate a graphical user interface including a rendering of one of at least a portion of an exterior and an interior of the virtual home, wherein the rendering includes selectable real world drill-down elements corresponding to at least some of the real world elements, insurance policy information associated with the first insured party, and selectable simulation icons for simulating an impact of one of a plurality of events to the portion of the virtual home, wherein the selectable simulation icons include at least a (i) hurricane simulation icon, (ii) a hail simulation icon, (iii) a tornado simulation icon, and (iv) an electrical power surge simulation icon;
            responsive to a selection of one of the real world drill-down elements from the remote insured party device, generate and transmit to the remote insured party device, for depiction on the graphical user interface, a supplemental electronic message including supplemental insurance information about the selected real world drill-down element and a first selectable option to obtain coverage adjustment information recommended for the selected one of the real world elements;
            responsive to receipt, from the remote insured party device, of a selection of one of the simulation icons:
               execute, by one or more trained predictive models, a simulation for an event corresponding to the selected one of the simulation icons to predict a damage estimate corresponding to the simulation; and
               generate and transmit to the remote insured party device, for depiction on the graphical user interface, a display including the damage estimate predicted by the simulation corresponding to the impact of the event to the rendered one of the exterior and the interior of the virtual home and a portion of the predicted damage estimate not covered by an insurance policy of the first insured party, and a second selectable option to obtain a suggested improvement to a current level of coverage based upon the damage estimate; and
            responsive to selection of the first selectable option or the second selectable option to obtain the suggested improvement to a current level of coverage, generate and transmit to the remote insured party device, for depiction on the graphical user interface, the suggested improvement to the current level of coverage.

2. The system of claim 1, wherein the authentication information is associated with at least one of: (i) a username and password, (ii) biometric information, (iii) a telephone number, (iv) a ZIP code, (v) social media site information, and (vi) an insurance policy identifier).

3. The system of claim 1, wherein the authentication module is further configured to, responsive to verification of the authentication information, receive an adjustment of at least one of the real world drill-down elements, wherein the adjustment comprises at least one of: (i) an image of the real world element, (ii) a video of the real world element, (iii) an automatically created location of the real world element, and (iv) a date or time associated with the real world element.

4. The system of claim 1, wherein the virtual home platform is in communication with a claims processing system and further wherein the rendering of the virtual home includes an exchange of information between the virtual home platform and the claims processing system.

5. The system of claim 1, wherein the insurance policy is associated with a homeowner's insurance policy.

6. The system of claim 5, wherein the insurance policy is associated with at least one of: (i) an existing insurance policy, (ii) a potential insurance policy, (iii) an insurance policy renewal, and (iv) an insurance policy upgrade.

7. The system of claim 1, wherein the remote insured party device is associated with at least one of: (i) a computer executing a browser, (ii) a smartphone executing a browser, (iii) a smartphone executing an application, (iv) eyeglasses, (v) a smart watch, and (vi) a virtual reality device.

8. The system of claim 1, wherein said rendering is associated with at least one of: (i) an exterior of the virtual home, (ii) a floorplan of the virtual home, and (iii) a room within the virtual home.

9. The system of claim 1, wherein the processor is further configured to:
generate and transmit to the remote insured party device a click-to-chat icon;
responsive to selection of the click-to-chat icon, receive, from the remote insured party device, a request to communicate, and
responsive to the received request to communicate, facilitate communication with the first insured party.

10. The system of claim 9, wherein the communication is associated with a virtual agent that automatically generates recommendations for the first insured party based on at least one of: (i) demographic information, (ii) geographic information, (iii) income information, (iv) age information, (v) gender information, (vii) a home value, and (viii) an average amount of insurance protection associated with other insured parties.

11. The system of claim 1, wherein the selectable simulation icons further includes one or more of: (i) a fire simulation icon, (ii) a flood simulation icon, (iii) a cyber-crime event simulation icon, (iv) a tree falling simulation icon, and (v) a broken pipe simulation icon.

12. The system of claim 11, wherein the result is associated with at least one of: (i) an insurance protection score, and (ii) a graphically displayed risk meter.

13. The system of claim 11, wherein the first insurance party is a business, and the virtual home is a commercial location.

14. The system of claim 1, wherein at least some of the first virtual home information is automatically populated based on a template selected for the first insured party.

15. The system of claim 1, wherein the supplemental insurance information includes testimonial information from another insured party of the insurance enterprise.

16. The system of claim 1, wherein the supplemental insurance information includes at least one of: (i) prior claim information, (ii) insurance upgrade information, (ii) a roof valuation, (iv) equipment breakdown, (v) flood insurance, (vi) earthquake insurance, (vii) water, sewer back-up, or sump overflow damage, (viii) liability limits, and (ix) umbrella insurance coverage.

17. The system of claim 1, wherein the supplemental insurance information comprises drill-down information associated with at least one of: (i) valuable articles, (ii) theft of jewelry, watches, furs, precious stones, or semi-precious stones, (iii) worldwide personal property coverage, (iv) coverages limits, (v) electronics coverage, (vi) refrigerated items, and (vii) loss assessment.

18. The system of claim 1, wherein the authentication module is further configured to:
automatically transmit information about the virtual home to: (i) an email server, (ii) a workflow application, (iii) a report generator, (iv) a social media server, (v) a calendar application, (vi) a predictive model, and (vii) a map application.

19. A computerized method associated with an insurance enterprise, the method comprising:
receiving, by a communication device, from a remote insured party device associated with a first insured party, at least one electronic message including authentication information and an associated virtual home display request,
verifying, by a processor, the authentication information in the at least one electronic message;
responsive to failure to verify the authentication information, generating, for provision to the remote insured party device, a graphical user interface including a generic rendering of one of at least a portion of an exterior and an interior of a generic virtual home, said generic rendering including selectable generic elements automatically populated into the generic rendering; and
responsive to a positive verification of the authentication information:
automatically associating a first insured party with first virtual home information including real world elements of a virtual home;
automatically associating the first virtual home information with first insurance policy information of the first insured party;
responsive to the received virtual home display request, automatically generating a graphical user interface including a rendering of one of at least a portion of an exterior and an interior of the virtual home, wherein the rendering includes selectable real world drill-down elements corresponding to the first virtual home information, including at least some of the real world elements, the first insurance policy information, and selectable simulation icons for simulating an impact of one of a plurality of events to the portion of the virtual home, wherein the selectable simulation icons include at least a (i) hurricane simulation icon, (ii) a hail simulation icon, (iii) a tornado simulation icon, and (iv) an electrical power surge simulation icon;
responsive to receiving a selection of one of the real world drill-down elements, transmitting, to the remote insured party device, for depiction on the graphical user interface, supplemental insurance information about the one of the selected real world drill-down elements and a first selectable option to obtain coverage adjustment information recommended for the one of the selected real world drill-down elements;
responsive to receiving a selection of one of the simulation icons, from the remote insured party device:

executing, by one or more trained predictive models, a simulation for an event corresponding to the selected one of the simulation icons to predict a damage estimate corresponding to the simulation; and generating and transmitting to the remote insured party device, for depiction on the graphical user interface, a display including the damage estimate predicted by the simulation corresponding to the impact of the event to the rendered one of the exterior and the interior of the virtual home and a portion of the predicted damage estimate not covered by an insurance policy of the first insured party, and a second selectable option to obtain a suggested improvement to a current level of coverage based upon the damage estimate; and responsive to selection of the first selectable option or the second selectable option to obtain the suggested improvement to the current level of coverage, generating and transmitting to the remote insured party device, for depiction on the graphical user interface, the suggested improvement to the current level of coverage.

20. The method of claim 19, wherein the selectable simulation icons further includes one or more of: (i) a fire simulation icon, (ii) a flood simulation icon, (iii) a cyber-crime event simulation icon, (iv) a tree falling simulation icon, and (v) a broken pipe simulation icon.

21. The method of claim 19, wherein the remote insured party device is associated with at least one of: (i) a computer executing a browser, (ii) a smartphone executing a browser, (iii) a smartphone executing an application, (iv) eyeglasses, (v) a smart watch, and (vi) a virtual reality device.

22. The method of claim 19, wherein said rendering is associated with at least one of: (i) an exterior of the virtual home, (ii) a floorplan of the virtual home, and (iii) a room within the virtual home.

23. A system associated with an insurance enterprise, the system comprising:

a communication device to receive, from a remote insured party device associated with a first insured party, authentication information and a virtual home display request; and a processor in communication with the communication device, wherein the processor is configured to:
verify the authentication information;
responsive to failure to verify the authentication information, generate, for provision to the remote insured party device, a graphical user interface including a generic rendering of one of at least a portion of an exterior and an interior of a generic virtual home, said generic rendering including selectable generic elements automatically populated into the generic rendering; and
responsive to a positive verification of the authentication information:
automatically associate a first insured party with first virtual home information including real world elements of a virtual home,
automatically associate the first virtual home information with first insurance policy information of the first insured party,
responsive to the received virtual home display request, automatically generate a graphical user interface including a rendering of one of at least a portion of an exterior and an interior of the virtual home including selectable real world drill-down elements corresponding to the first virtual home information, wherein the rendering includes at least some of the real world elements, the first insurance policy information, and selectable simulation icons for simulating an impact of one of a plurality of events to the portion of the virtual home, wherein the selectable simulation icons include at least a (i) hurricane simulation icon, (ii) a hail simulation icon, (iii) a tornado simulation icon, and (iv) an electrical power surge simulation icon,
receive, from the remote insured party device, a selection of one of the real world drill-down elements,
responsive to the selected real world drill-down element, transmit, to the remote insured party device, for depiction on the graphical user interface, supplemental insurance information about the selected real world drill-down element and a first selectable option to obtain coverage adjustment information recommended for the selected real world drill-down element;
responsive to receipt, from the remote insured party device, of a selection of one of the simulation icons:
execute, by one or more trained predictive models, a simulation for an event corresponding to the selected one of the simulation icons to predict a damage estimate corresponding to the simulation; and
generate and transmit to the remote insured party device, for depiction on the graphical user interface, a display including the damage estimate predicted by the simulation corresponding to the impact of the event to the rendered one of the exterior and the interior of the virtual home and a portion of the predicted damage estimate not covered by an insurance policy of the first insured party, and a second selectable option to obtain a suggested improvement to a current level of coverage based upon the damage estimate; and
responsive to selection of the first selectable option or the second selectable option to obtain coverage the suggested improvement to the current level of coverage, generate and transmit to the remote insured party device, for depiction on the graphical user interface, the suggested improvement to the current level of coverage.

* * * * *